A method, system and computer program product for retrieving both sensitive and non-sensitive content in a secure manner. After a proxy server establishes a secure connection between a client device and a web server, the client device receives the requested sensitive content, which includes an index file that contains a hash value that was generated by the web server. The web browser of the client device further issues a request to the proxy server to establish a non-secure connection to retrieve non-sensitive static content from the web server. After receiving the requested content, the web browser of the client device generates a hash value over the received content. If this generated hash value is equal to the hash value contained in the index file, then the web browser accepts the received non-sensitive static content. In this manner, both sensitive and non-sensitive content can be retrieved in a secure manner.

(12) United States Patent
Ander et al.

(10) Patent No.: US 9,288,189 B2
(45) Date of Patent: Mar. 15, 2016

(54) RETRIEVING BOTH SENSITIVE AND NON-SENSITIVE CONTENT IN A SECURE MANNER

(71) Applicant: International Business Machines Corporation, Armonk, NY (US)

(72) Inventors: Stuart D. Ander, Dallas, TX (US); Sanjay J. Cherian, Flower Mound, TX (US); Daniel J. Engstrom, Irving, TX (US); Aaron K. Shook, Raleigh, NC (US); David M. Stecher, Seattle, WA (US); Jeffrey H. Woods, Irving, TX (US); Billy C. Wu, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 14/148,433

(22) Filed: Jan. 6, 2014

(65) Prior Publication Data
US 2015/0195253 A1    Jul. 9, 2015

(51) Int. Cl.
*H04L 29/06* (2006.01)
*H04L 29/08* (2006.01)

(52) U.S. Cl.
CPC ............ *H04L 63/0281* (2013.01); *H04L 67/02* (2013.01); *H04L 67/2804* (2013.01)

(58) Field of Classification Search
None
See application file for complete search history.

(56) References Cited

U.S. PATENT DOCUMENTS

| 6,606,663 | B1 | 8/2003 | Liao et al. |
| 8,181,238 | B2 | 5/2012 | Holar et al. |
| 2001/0030970 | A1* | 10/2001 | Wiryaman et al. ............ 370/401 |
| 2005/0108517 | A1 | 5/2005 | Dillon et al. |
| 2009/0199289 | A1 | 8/2009 | Davis |
| 2009/0210707 | A1* | 8/2009 | De Lutiis et al. ............. 713/170 |

OTHER PUBLICATIONS

Ecker et al., "HTTPS is Great: Here's Why Everyone Needs to Use it (So We Can Too)," http://arstechnica.com/business/news/2011/03/https-is-great-here-is-why-everyone-needs-to-use-it-so-ars-can-too.ars, pp. 1-7, Mar. 22, 2011.

"Can a Proxy Server Cache SSL GETs? If not, Would Response Body Encryption Suffice?" http://stackoverflow.com/questions/14656/can-a-proxy-server-cache-ssl-gets-if-not-would-response-body-encryption-suffic, pp. 1-4, Aug. 18, 2008.

(Continued)

*Primary Examiner* — Hadi Armouche
*Assistant Examiner* — Malcolm Cribbs
(74) *Attorney, Agent, or Firm* — Robert A. Voigt, Jr.; Winstead, P.C.

(57) ABSTRACT

12 Claims, 4 Drawing Sheets

(56) References Cited

OTHER PUBLICATIONS

"Web Debugging Proxy Application for Windows, Mac OS and Linux," http://www.charlesproxy.com/documentation/proxying/ssl-proxying, pp. 1-3, 2011.

"The Industry-Leading Secure Web Gateway," http://www.bluecoat.com/products/proxysg, pp. 1-2, 2011.

Joanne Cummings, "Data Center Automation Shines at SunTrust," http://www.networkworld.com/allstar/2007/112607-suntrust-data-center-automation.html, pp. 1-3, Nov. 26, 2007.

"File:Akamaiprocess.png," http://en.wikipedia.org/wiki/File:Akamaiprocess.png, p. 1, 2011.

David Heinemeier Hansson, "'Mixed Content Warning', How I Loathe Thee!" http://37signals.com/svn/posts/1431-mixed-content-warning-how-i-loathe-thee, pp. 1-10, Nov. 27, 2008.

Cooper et al., "Known HTTP Proxy/Caching Problems," ip.com No. IPCOM000005327D, pp. 1-34, Jun. 1, 2001.

Le Faucheur et al., "Resource Reservation Protocol (RSVP) Proxy Approaches," ip.com No. IPCOM0002000407D, pp. 1-101, Oct. 1, 2010, see Section 4, pp. 18-68 of scanned document.

Anonymous, "Enhanced Security Web Proxy and Reverse Web Proxy," ip.com No. IPCOM000176082D, pp. 1-7, Nov. 4, 2008.

"Static Signing: An Alternative to SSL," http://jonmah.tumblr.com/post/18281110021/static-signing, pp. 1-3, Feb. 25, 2012.

\* cited by examiner

RETRIEVING BOTH SENSITIVE AND NON-SENSITIVE CONTENT IN A SECURE MANNER

TECHNICAL FIELD

The present invention relates generally to communications over a computer network, and more particularly to retrieving both sensitive and non-sensitive content by a web browser in a secure manner.

BACKGROUND

A web page is a web document or other web resource that is suitable for the World Wide Web and can be accessed through a web browser and displayed on a user's computing device display. Web pages may be retrieved by the web browser from a remote server, commonly referred to as a "web server," via a protocol, such as HyperText Transfer Protocol (HTTP). The retrieved web page may be in the form of a HyperText Markup Language (HTML) document (also referred to as the HTML index file) comprised of HTML elements that may define aspects (e.g., images, styles) of the web page. In addition to retrieving resources, such as the HTML index file, using the HTTP protocol, the web browser may retrieve other resources, such as static resources (e.g., images, Cascading Style Sheet (CSS) style settings), from the web server that were defined by the HTML elements in the HTML index file.

Currently, the web browser may issue HTTP requests to the web server to obtain these resources via a "proxy server." A proxy server is a server (a computer system or an application) that acts as an intermediary between the user's computing device and the web server. The resources requested by the user may be cached by the proxy server. For example, when the user requests access to a web page, the resources, such as the HTML index page, images, audio, video content and CSS style settings, may already be cached by the proxy server. As a result, such resources can be obtained directly from the proxy server as opposed from the web server thereby reducing the download time in retrieving these resources as well as freeing up the web server to service other requests.

However, when the user desires to retrieve sensitive content (e.g., payment transaction), the web browser of the user's computing device connects to the web server using a communications protocol (e.g., HyperText Transfer Protocol Secure (HTTPS)) for secure communication. If a web page contains sensitive information (e.g., log-in page), then the user's computing device needs to load all content, including non-sensitive content (e.g., image), from the web server over HTTPS or else the user will be vulnerable to attacks and/or surveillance. As a result, the web browser uses the HTTPS communications protocol for the entire downloading of the content, including non-sensitive content, from the web server. When the web browser requests resources using HTTPS, the web browser issues a preliminary connect request to the proxy server instructing the proxy server to establish a Secure Sockets Layer (SSL) tunnel between the user's computing device and the web server. Once established, the proxy server is unaware of the HTTP traffic between the web browser and the web server. As a result, the proxy server is unable to identify the resources being retrieved by the web browser and therefore cannot cache them for the benefit of other users.

Due to the increasing use of HTTPS for its security benefits, these web servers are facing an ever greater load since intermediary proxy servers are unable to cache static content, even non-sensitive content, when the entire content, including non-sensitive content, needs to be transmitted using the HTTPS communications protocol when the web browser establishes an HTTPS connection with the web server.

BRIEF SUMMARY

In one embodiment of the present invention, a method for retrieving both sensitive and non-sensitive content in a secure manner comprises issuing a request to a proxy server to establish a secure connection with a server to retrieve sensitive content comprising an index file. The method further comprises receiving the index file from the server using the secure connection, where the index file comprises a first hash value computed by the server. Furthermore, the method comprises issuing a request to the proxy server to establish a non-secure connection with the server to retrieve non-sensitive static content. Additionally, the method comprises receiving the non-sensitive static content using the non-secure connection. The method further comprises generating, by a processor, a second hash value using the received non-sensitive static content. In addition, the method comprises accepting the non-sensitive static content in response to the second hash value equaling the first hash value.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
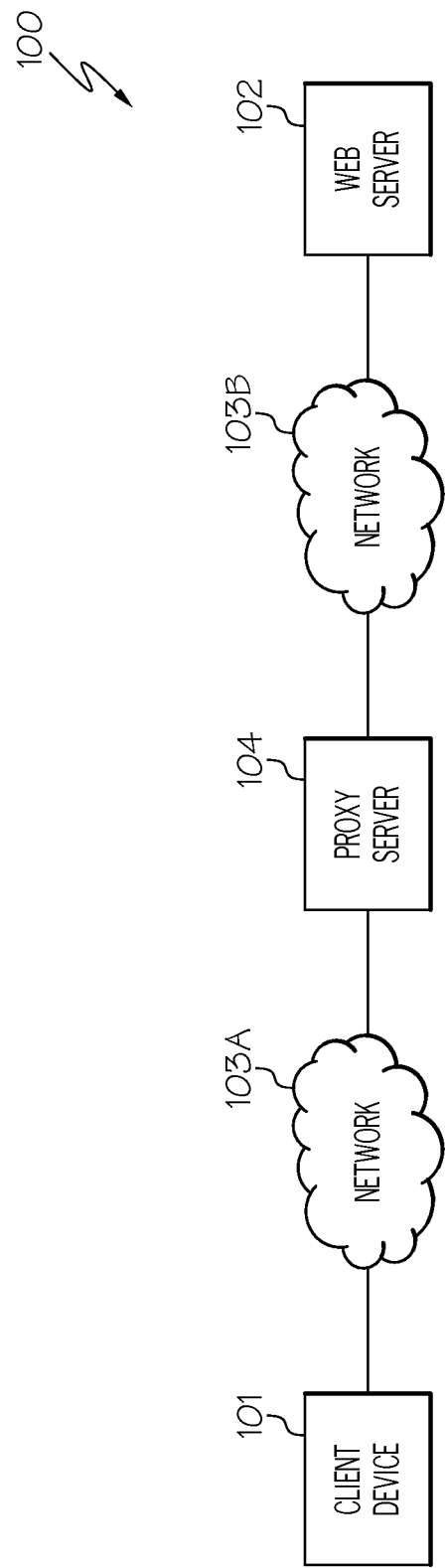
FIG. 1 illustrates a network system configured in accordance with an embodiment of the present invention.

The present invention comprises a method, system and computer program product for retrieving both sensitive and non-sensitive content in a secure manner. In one embodiment of the present invention, the web browser of a client device issues a request to a proxy server to establish a secure connection (e.g., HTTPS connection) with a web server to retrieve sensitive content that includes an index file (e.g., HTML index file). Upon the proxy server establishing a Secure Sockets Layer (SSL) tunnel between the web server and the client device, the client device receives the requested sensitive content, which includes an index file that contains a hash value that was generated by the web server. The web browser further issues a request to the proxy server to establish a non-secure connection (e.g., HTTP connection) to retrieve non-sensitive static content (e.g., images, audio, video, style settings) from the web server. If the proxy server has the requested content in its cache, the proxy server will retrieve the requested content from its cache. Otherwise, the proxy server will retrieve the requested content from the web server and cache the obtained content for subsequent usage. After retrieving the requested content from either its cache or from the web server, the proxy server transmits the retrieved non-sensitive static content to the client device. The web browser of the client device then generates a hash value over the received non-sensitive static content. If this generated hash value is equal to the hash value contained in the index file, then the web browser accepts the received non-sensitive static content. Otherwise, the web browser does not accept the received non-sensitive static content. Because the hash value contained in the received index file was computed by the web server and received over a secure connection, it is a value that may be deemed to be trustworthy. Hence, if the hash value generated by the web browser equals the hash value contained in the received index file, then it is assumed that the non-sensitive static content is trustworthy and can be accepted by the web browser. In this manner, both sensitive and non-sensitive content can be retrieved in a secure manner. That is, requests over a secure connection (e.g., HTTPS connection) and requests over a non-secure connection (e.g., HTTP connection) can be mixed without compromising the integrity of the sensitive content obtained over the secure connection.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a network system 100 for practicing the principles of the present invention in accordance with an embodiment of the present invention. Network system 100 includes a client device 101 connected to a web server 102 via networks 103A-103B and a proxy server 104. In particular, as shown in FIG. 1, client device 101 is connected to proxy server 104 via network 103A and proxy server 104 is connected to web server 102 via network 103B. Networks 103A-103B may collectively or individually be referred to as networks 103 or network 103, respectively.

Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 (e.g., network 103A) and consequently communicating with proxy server 104 and web server 102. A description of the hardware configuration of client device 101 is provided below in connection with FIG. 2.

In one embodiment, web server 102 is configured to host websites. In one embodiment, web server 102 is configured to deliver web resources (requested by client device 101) to client device 101 using a non-secure connection (e.g., HyperText Transfer Protocol (HTTP)) or a secure connection (e.g., HyperText Transfer Protocol Secure (HTTPS)). Such web resources may include a HyperText Markup Language (HTML) index file and any additional content that is defined by the HTML elements in the HTML index file. A description of the hardware configuration of web server 102 is provided below in connection with FIG. 3.

In one embodiment, proxy server 104 (a computer system or an application) is configured to act as an intermediary between client device 101 and web server 102. As a result, the requests issued by client device 101, such as to establish a non-secure connection (e.g., HTTP connection) to retrieve non-sensitive static content (e.g., images, audio, video, style settings) or to establish a secure connection (e.g., HTTPS connection) to retrieve sensitive content (e.g., payment information), will be serviced by proxy server 104 prior to being serviced by web server 102. "Sensitive content," as used herein, refers to any content that is personal or private (e.g., payment information, social security number, driver's license, passport number, address information) that is to be securely communicated between client device 101 and web server 102. "Non-sensitive content," as used herein, refers to content that is not personal or private (e.g., images, audio, video, style settings) that can be non-securely communicated between client device 101 and web server 102. "Non-sensitive static content," refers to the non-sensitive content that is referenced or defined in the HTML index file that will not change in content unless the change is written in the HTML index file.

Furthermore, proxy server 104 is configured to cache requested non-sensitive static content. As a result, if client device 101 requests non-sensitive static content that had been previously cached by proxy server 104, then proxy server 104 retrieves the requested non-sensitive static content from its cache and transmits the retrieved content to client device 101. Otherwise, proxy server 104 will retrieve the requested non-sensitive static content from web server 102 and transmit the retrieved non-sensitive static content to client device 101. A further description of the functionality of proxy server 104 in allowing client device 101 to retrieve both sensitive and non-sensitive content in a secure manner is discussed further below in connection with FIG. 4. A description of the hardware configuration of proxy server 104 is provided below in connection with FIG. 3.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

While FIG. 1 illustrates a single client device 101, proxy server 104 and web server 102, network system 100 may include any number of clients 101, proxy servers 104 and web servers 102 that are interconnected via one or more networks 103. The embodiments of network system 100 are not to be limited in scope to the depiction of FIG. 1.

Figure 2:
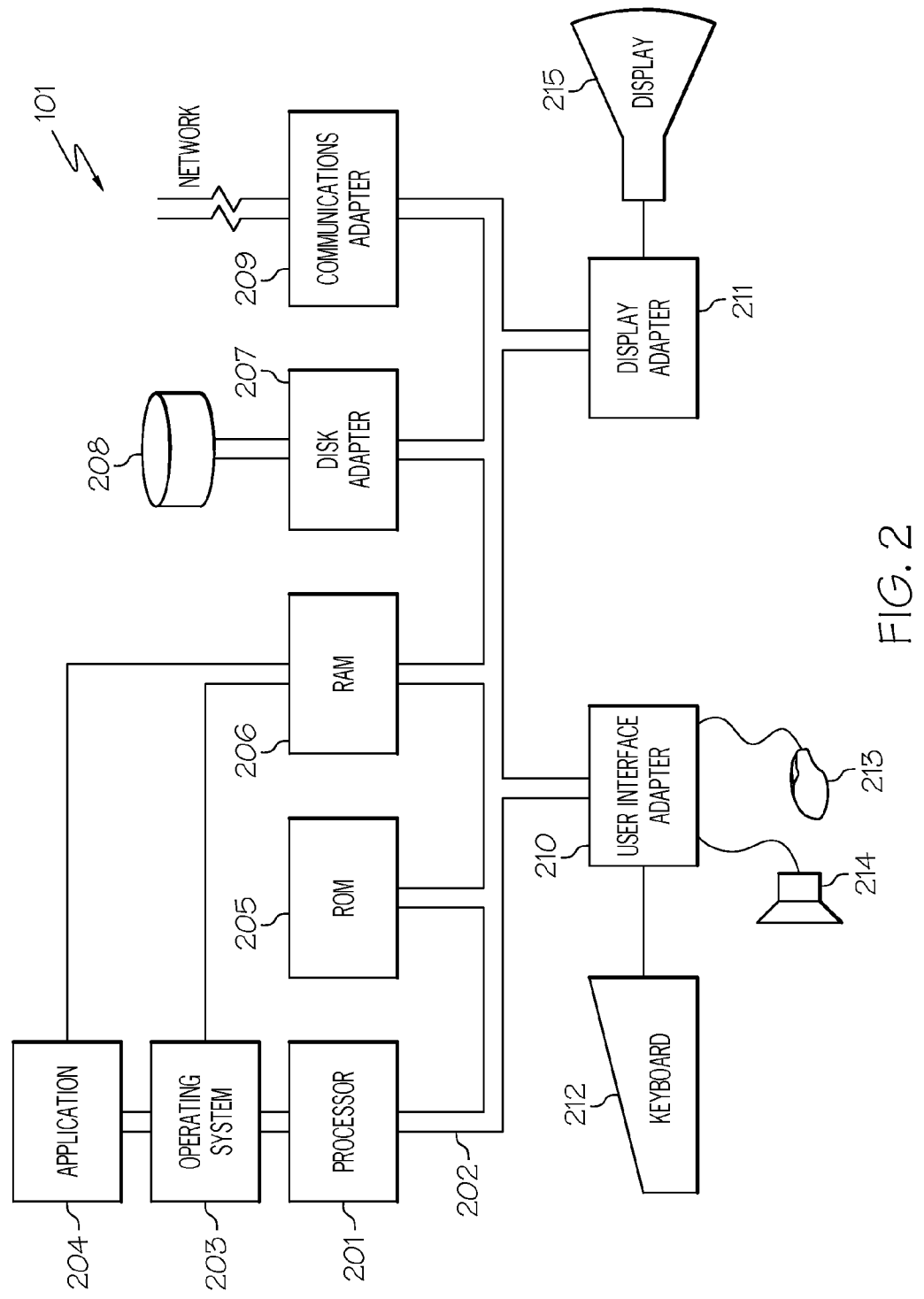
FIG. 2 illustrates a hardware configuration of a client device in accordance with an embodiment of the present invention.

Referring now to FIG. 2, FIG. 2 illustrates a hardware configuration of client device 101 (FIG. 1) which is representative of a hardware environment for practicing the present invention. Referring to FIG. 2, client device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a web browser.

Referring again to FIG. 2, read-only memory ("ROM") 205 is coupled to system bus 202 and includes a basic input/output system ("BIOS") that controls certain basic functions of client device 101. Random access memory ("RAM") 206 and disk adapter 207 are also coupled to system bus 202. It should be noted that software components including operating system 203 and application 204 may be loaded into RAM 206, which may be client device's 101 main memory for execution. Disk adapter 207 may be an integrated drive electronics ("IDE") adapter that communicates with a disk unit 208, e.g., disk drive.

Client device 101 may further include a communications adapter 209 coupled to bus 202. Communications adapter 209 interconnects bus 202 with an outside network (e.g., network 103A of FIG. 1) thereby enabling client device 101 to communicate with proxy server 104 (FIG. 1) and web server 102 (FIG. 1).

I/O devices may also be connected to client device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to client device 101 through keyboard 212 or mouse 213 and receiving output from client device 101 via display 215 or speaker 214.

Figure 3:
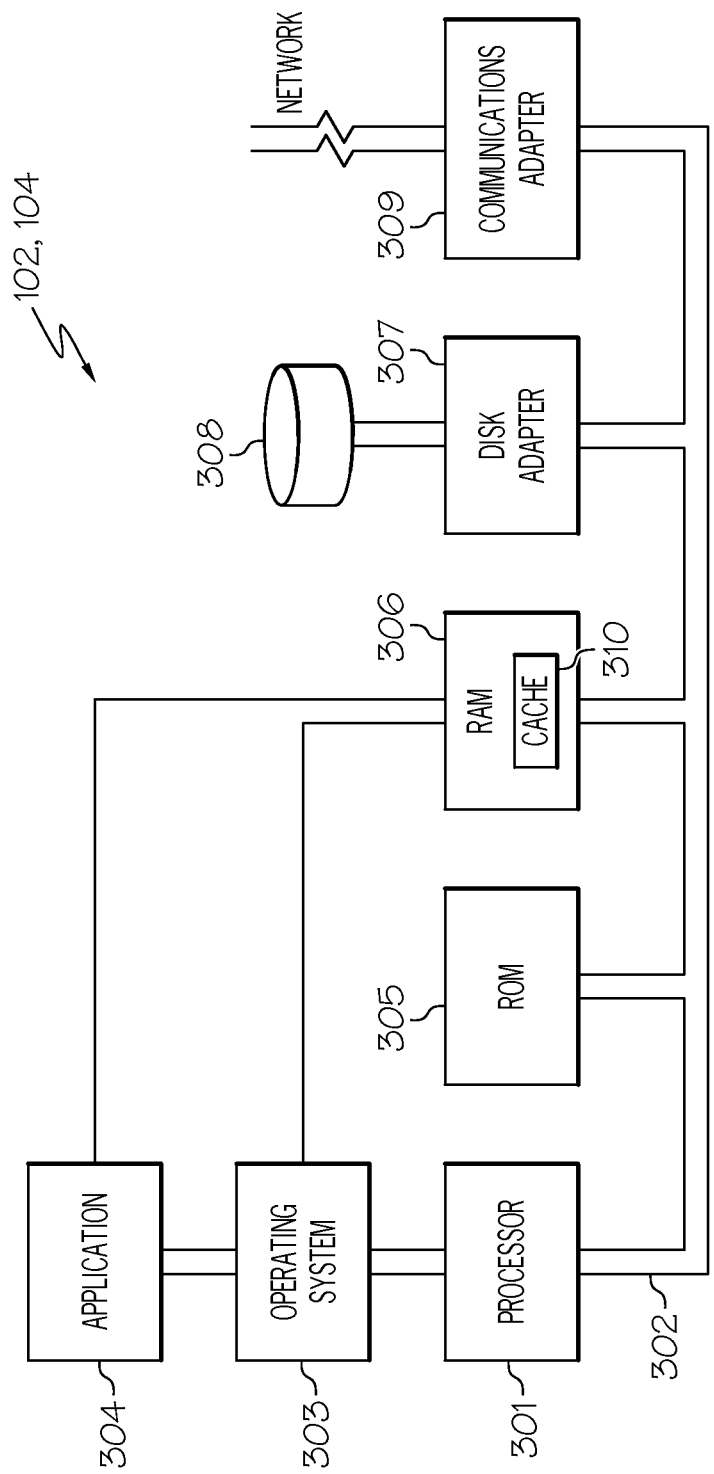
FIG. 3 illustrates a hardware configuration of a web server and a proxy server in accordance with an embodiment of the present invention.

Referring now to FIG. 3, FIG. 3 illustrates a hardware configuration of web server 102 (FIG. 1), proxy server 104 (FIG. 1) which is representative of a hardware environment for practicing the present invention. Web server 102, proxy server 104 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 of proxy server 104 may include, for example, a program for caching non-sensitive static content in a cache, such as a cache 310 in memory 306. It is noted that cache 310 may reside in other locations (e.g., disk unit 308, internally to processor 301) and that cache 310 may be part of another cache.

Referring again to FIG. 3, read-only memory ("ROM") 305 is coupled to system bus 302 and includes a basic input/output system ("BIOS") that controls certain basic functions of web server 102, proxy server 104. Random access memory ("RAM") 306 and disk adapter 307 are also coupled to system bus 302. It should be noted that software components including operating system 303 and application 304 may be loaded into RAM 306, which may be web server's 102, proxy server's 104 main memory for execution. Disk adapter 307 may be an integrated drive electronics ("IDE") adapter that communicates with a disk unit 308, e.g., disk drive.

Web server 102, proxy server 104 may further include a communications adapter 309 coupled to bus 302. Communications adapter 309 interconnects bus 302 with an outside network (e.g., network 103 of FIG. 1) thereby enabling web server 102, proxy server 104 to communicate with client device 101 (FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, a web browser may issue HTTP requests to a web server to obtain web resources via a proxy server. The resources requested by the user may be cached by the proxy server. For example, when the user requests access to a web page, the resources, such as the HTML index page, images, audio, video content and CSS style settings, may already be cached by the proxy server. As a result, such resources can be obtained directly from the proxy server as opposed from the web server thereby reducing the download time in retrieving these resources as well as freeing up the web server to service other requests. However, when the user desires to retrieve sensitive content (e.g., payment transaction), the web browser of the user's computing device connects to the web server using HTTPS for secure communication. If a web page contains sensitive information (e.g., log-in page), then the user's computing device needs to load all content, including non-sensitive content (e.g., image), from the web server over HTTPS or else the user will be vulnerable to attacks and/or surveillance. As a result, the web browser uses the HTTPS communications protocol for the entire downloading of the content, including non-sensitive content, from the web server. When the web browser requests resources using HTTPS, the web browser issues a preliminary connect request to the proxy server instructing the proxy server to establish a Secure Sockets Layer (SSL) tunnel between the user's computing device and the web server. Once established, the proxy server is unaware of the HTTP traffic between the web browser and the web server. As a result, the proxy server is unable to identify the resources being retrieved by the web browser and therefore cannot cache them for the benefit of other users. Due to the increasing use of HTTPS for its security benefits, these web servers are facing an ever greater load since intermediary proxy servers are unable to cache static content, even non-sensitive content, when the entire content, including non-sensitive content, needs to be transmitted using the HTTPS communications protocol when the web browser establishes an HTTPS connection with the web server.

The principles of the present invention provide a means for enabling the web browser of a user's computing device to download the sensitive content from the web server using a secure connection and to download the non-sensitive static content, such as from the proxy server, using a non-secure connection in a secure manner as discussed below in connection with FIG. 4.

Figure 4:
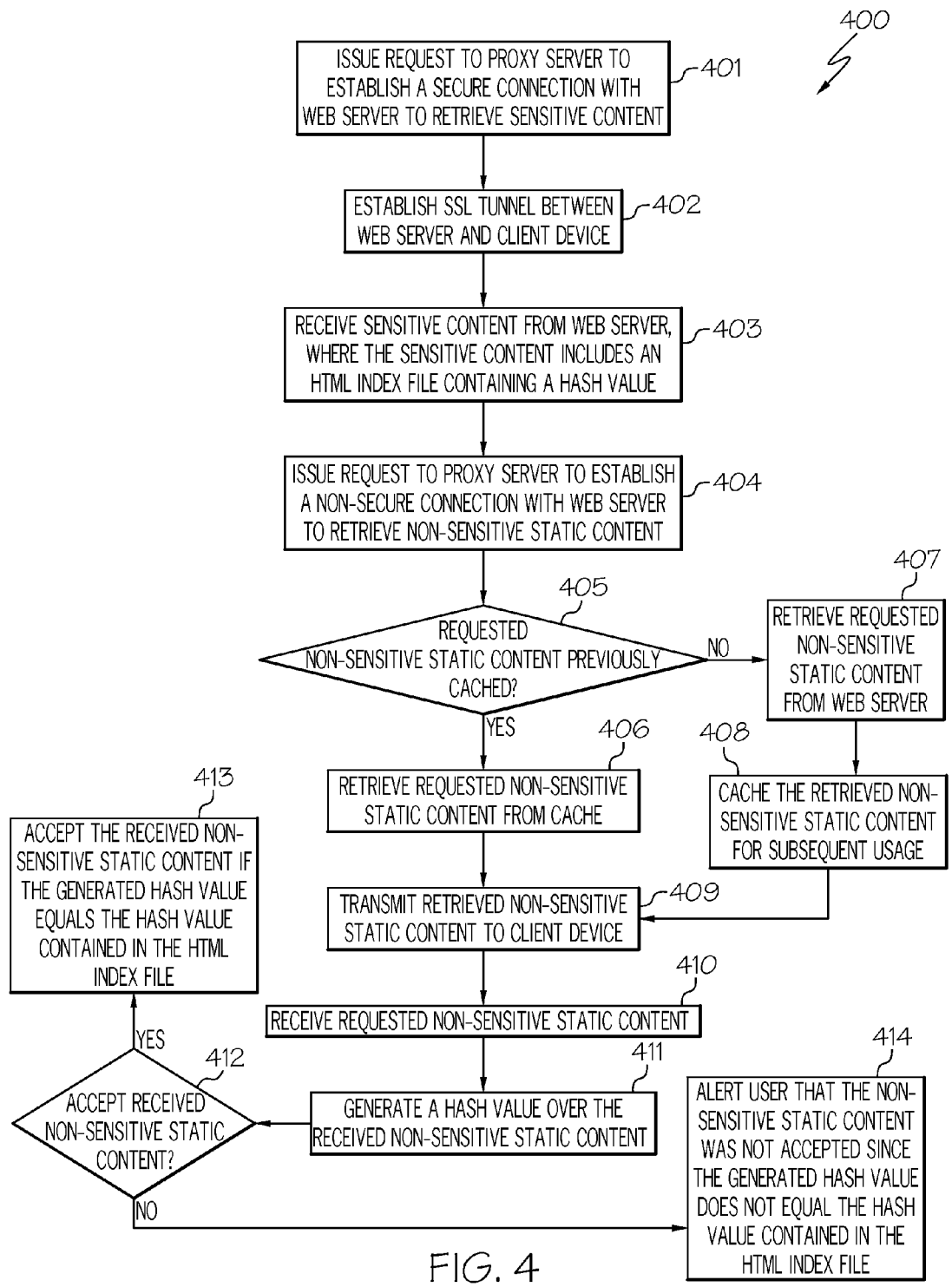
FIG. 4 is a flowchart of a method for retrieving both sensitive and non-sensitive content in a secure manner in accordance with an embodiment of the present invention.

FIG. 4 is a flowchart of a method 400 for retrieving both sensitive and non-sensitive content in a secure manner in accordance with an embodiment of the present invention.

Referring to FIG. 4, in conjunction with FIGS. 1-3, in step 401, the web browser of client device 101 issues a request to proxy server 104 to establish a secure connection with web server 102 to retrieve sensitive content that includes an index file, such as an HTML index file.

In step 402, proxy server 104, upon receiving the request of step 401 from client device 101, establishes a Secure Sockets Layer (SSL) tunnel between web server 102 and client device 101.

In step 403, client device 101 receives the requested sensitive content which includes an index file, such as an HTML index file. In one embodiment, the index file includes a hash value that was generated by web server 102, such as a hash value generated using a cryptographic hash function (e.g., SHA-1).

In step 404, the web browser of client device 101 issues a request to proxy server 104 to establish a non-secure connection with web server 102 to retrieve non-sensitive static content (e.g., images, audio, video, style settings).

In step 405, a determination is made by proxy server 104 as to whether the requested non-sensitive static content is cached in proxy server 104. That is, proxy server 104 determines whether the requested non-sensitive static content had been previously cached by proxy server 104.

If the requested non-sensitive static content had been previously cached by proxy server 104, then, in step 406, proxy server 104 retrieves the requested non-sensitive static content from its cache 310. By retrieving the requested non-sensitive static content from its cache 310, client device 101 will be able to access the requested content more quickly than having it retrieved from web server 102. Furthermore, since the request is being serviced by proxy server 104, the load of web server 102 will be reduced.

If, however, the requested non-sensitive static content had not been previously cached by proxy server 104, then, in step 407, proxy server 104 retrieves the requested non-sensitive static content from web server 102. In step 408, proxy server 104 caches the retrieved non-sensitive static content in its cache 310 for subsequent usage (i.e., caches the retrieved non-sensitive static content in its cache 310 in order to service future requests for the retrieved non-sensitive static content from its cache 310).

Upon retrieving the requested non-sensitive static content in steps 406, 407, proxy server 104 transmits the retrieved non-sensitive static content to client device 101 in step 409.

In step 410, client device 101 receives the requested non-sensitive static content. In order to ensure that the non-sensitive static content is trustworthy, the web browser of client device 101, in step 411, generates a hash value over the received non-sensitive static content.

In step 412, a determination is made by the web browser of client device 101 as to whether to accept the received non-sensitive static content.

If the hash value generated in step 411 is equal to the hash value contained in the received index file (received in step 403), then, in step 413, the web browser of client device 101 accepts the received non-sensitive static content. Because the hash value contained in the received index file was computed by web server 102 and received over a secure connection, it is a value that may be deemed to be trustworthy (i.e., a value that has not been tampered with). Hence, if the hash value generated in step 411 (i.e., the hash value generated using the received non-sensitive static content) equals the hash value contained in the received index file, then it is assumed that the non-sensitive static content is trustworthy and can be accepted by the web browser. In this manner, both sensitive and non-sensitive content can be retrieved in a secure manner. That is, requests over a secure connection (e.g., HTTPS connection) and requests over a non-secure connection (e.g., HTTP connection) can be mixed without compromising the integrity of the sensitive content obtained over the secure connection.

If, however, the hash value generated in step 411 does not equal to the hash value contained in the received index file (received in step 403), then, in step 414, the web browser of client device 101 does not accept the received non-sensitive static content and alerts the user of client device 101 regarding not accepting the received non-sensitive static content since the hash value generated in step 411 does not equal the hash value contained in the received index file (received in step 403). In one embodiment, the details regarding not accepting the received non-sensitive static content may be reported to web server 102.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for retrieving both sensitive and non-sensitive content in a secure manner, the method comprising:
   issuing a request to a proxy server to establish a secure connection with a server to retrieve sensitive content comprising a HyperText Markup Language (HTML) index file, wherein said HTML index file is comprised of HTML elements that define aspects of a web page;
   receiving said HTML index file from said server using said secure connection, wherein said HTML index file comprises a first hash value computed by said server;
   issuing a request to said proxy server to establish a non-secure connection with said server to retrieve non-sensitive static content;
   receiving said non-sensitive static content using said non-secure connection;
   generating, by a processor, a second hash value over said received non-sensitive static content;
   accepting said non-sensitive static content in response to said second hash value equaling said first hash value;
   alerting a user that said non-sensitive content was not accepted in response to said second hash value not equaling said first hash value; and
   caching said requested non-sensitive static content by said proxy server for subsequent usage in response to said proxy server not previously caching said requested non-sensitive static content.

2. The method as recited in claim 1 further comprising:
   receiving said non-sensitive static content from said proxy server using said non-secure connection in response to said proxy server previously caching said requested non-sensitive static content.

3. The method as recited in claim 1, wherein said non-secure connection comprises a HyperText Transfer Protocol (HTTP) connection, wherein said secure connection comprises a HyperText Transfer Protocol Secure (HTTPS) connection.

4. The method as recited in claim 1, wherein said non-sensitive static content comprises one or more of the following: images, audio, video, and style settings.

5. A computer program product embodied in a non-transitory computer readable storage medium for retrieving both sensitive and non-sensitive content in a secure manner, the computer program product comprising the programming instructions for:
   issuing a request to a proxy server to establish a secure connection with a server to retrieve sensitive content comprising a HyperText Markup Language (HTML) index file, wherein said HTML index file is comprised of HTML elements that define aspects of a web page;
   receiving said HTML index file from said server using said secure connection, wherein said HTML index file comprises a first hash value computed by said server;
   issuing a request to said proxy server to establish a non-secure connection with said server to retrieve non-sensitive static content;
   receiving said non-sensitive static content using said non-secure connection;
   generating a second hash value over said received non-sensitive static content;
   accepting said non-sensitive static content in response to said second hash value equaling said first hash value; and
   alerting a user that said non-sensitive content was not accepted in response to said second hash value not equaling said first hash value;
   wherein said proxy server caches said requested non-sensitive static content for subsequent usage in response to said proxy server not previously caching said requested non-sensitive static content.

6. The computer program product as recited in claim 5 further comprising the programming instructions for:
   receiving said non-sensitive static content from said proxy server using said non-secure connection in response to said proxy server previously caching said requested non-sensitive static content.

7. The computer program product as recited in claim 5, wherein said non-secure connection comprises a HyperText Transfer Protocol (HTTP) connection, wherein said secure connection comprises a HyperText Transfer Protocol Secure (HTTPS) connection.

8. The computer program product as recited in claim 5, wherein said non-sensitive static content comprises one or more of the following: images, audio, video, and style settings.

9. A system, comprising:
   a memory unit for storing a computer program for retrieving both sensitive and non-sensitive content in a secure manner; and a processor coupled to said memory unit, wherein the processor is configured to execute the program instructions of the computer program comprising:
    issuing a request to a proxy server to establish a secure connection with a server to retrieve sensitive content comprising a HyperText Markup Language (HTML) index file, wherein said HTML index file is comprised of HTML elements that define aspects of a web page;
    receiving said HTML index file from said server using said secure connection, wherein said HTML index file comprises a first hash value computed by said server;
    issuing a request to said proxy server to establish a non-secure connection with said server to retrieve non-sensitive static content;
    receiving said non-sensitive static content using said non-secure connection;
    generating a second hash value over said received non-sensitive static content;
    accepting said non-sensitive static content in response to said second hash value equaling said first hash value; and
    alerting a user that said non-sensitive content was not accepted in response to said second hash value not equaling said first hash value;
    wherein said requested non-sensitive static content is cached by said proxy server for subsequent usage in response to said proxy server not previously caching said requested non-sensitive static content.

10. The system as recited in claim 9, wherein the program instructions of the computer program further comprises:
    receiving said non-sensitive static content from said proxy server using said non-secure connection in response to said proxy server previously caching said requested non-sensitive static content.

11. The system as recited in claim 9, wherein said non-secure connection comprises a HyperText Transfer Protocol (HTTP) connection, wherein said secure connection comprises a HyperText Transfer Protocol Secure (HTTPS) connection.

12. The system as recited in claim 9, wherein said non-sensitive static content comprises one or more of the following: images, audio, video, and style settings.

* * * * *